Patented Oct. 17, 1933

1,931,192

UNITED STATES PATENT OFFICE 1,931,192

NITROGEN CONTAINING CYCLIC KETONE AND A PROCESS OF PREPARING IT

Heinrich Greune, Wilhelm Eckert, and Heinrich Sieber, Frankfort-on-the-Main-Hochst, and Gerhard Langbein, Hofheim in Taunus, Germany, assignors to General Aniline Works, Inc., New York, N. Y., a corporation of Delaware No Drawing. Application October 6, 1930, Serial No. 486,862, and in Germany October 17, 1929

11 Claims. (Cl. 260—127)

The present invention relates to nitrogen containing cyclic ketones and a process of preparing them.

We have found that nitrogen containing cyclic ketones are obtainable by causing a compound of the following formula

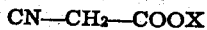

wherein X stands for hydrogen, an alkali metal residue or an alkyl group to react with a polynuclear aromatic compound containing at least one pair of free peri-positions in the presence of an acid condensing agent and, if desired, of an inert diluent. The reaction is preferably carried out in such a manner that the components are heated first at an elevated temperature which is lower than the decomposition temperature of the cyanacetic acid, as, for instance, at about 70° C. to about 140° C. and later on at a higher temperature, preferably at about 150° C. to about 190° C. As acid condensing agents there may be used, for instance, aluminium chloride, zinc chloride, iron chloride or the like. As diluents there may be used inorganic salts as, for instance, sodium chloride, potassium chloride, sodium fluoride or the like or organic solvents as, for instance, monochlorobenzene or trichlorobenzene. In many cases it is suitable to add to the reaction mixture a substance of a catalytic action such, for instance, as phosphorus oxychloride or to introduce gaseous hydrochloric acid. By these additions the yield of cyclic ketones may be increased and in many cases the quantity of the condensing agent required for this reaction can be diminished. The cyano-acetic acid may be used as such but also in the form of a salt or an ester.

When using, for instance, acenaphthene and cyano acetic acid as starting materials, the new reaction probably occurs in such a manner that the cyano group is first added to the hydrocarbon and the mono-ketimide of the peri-indandione is then formed with elimination of water and alcohol respectively, which reaction may be illustrated by the following scheme:

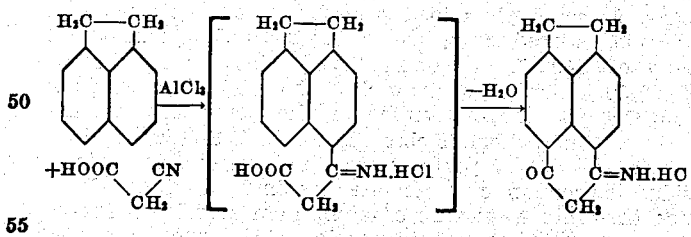

Such products obtainable according to the present process as correspond with the following probable formula

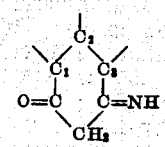

wherein the carbon atoms $C_1$, $C_2$ and $C_3$ are members of an aromatic grouping of the naphthalene or anthracene series $C_1$ and $C_3$ representing carbon atoms occupying the peri-positions of said grouping are to be considered as new products. They are generally obtained in the form of their salts especially the hydrochlorides, but the corresponding free imides may easily be obtained therefrom by a treatment with alkali.

The constitution of the new cyclic ketones has been proved by oxydative degradation.

The products obtained according to the present process are valuable intermediate products for the preparation of dyestuffs.

The following examples illustrate the invention, but they are not intended to limit it thereto:

(1) 300 parts of sodium-aluminium-chloride are melted and a mixture of 15 parts of acenaphthene and 10 parts of cyanoacetic acid is added at 140° C. The temperature rises to 150° C.–160° C. with evolution of hydrochloric acid, the whole is heated to 170° C. and this temperature is maintained for some time while stirring.

After decomposition with ice-water, the whole is filtered with suction and washed with a small quantity of water. The residue is extracted with hot water with addition of a small quantity of sulfuric acid. By adding to the filtrate concentrated hydrochloric acid, or a solution of sodium chloride, the condensation product is precipitated, which crystallizes in small yellow needles, melting above 300° C. It represents probably the hydrochloride of the ketimide of the periacenaphthene indandione of the following formula:

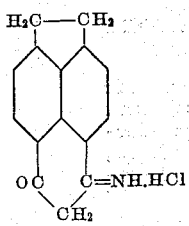

The yield is good. The product dissolves in concentrated sulfuric acid to a yellow solution having an intense green fluorescence.

When the ketimide hydrochloride is dissolved in warm water and mixed with concentrated caustic soda solution, the free monoketimide of the peri acenaphthene indandione separates in the form of a yellow powder. By recrystallization from alcohol, brilliant yellowish-brown needles of melting point 285° C.–287° C. are obtained.

(2) 27 parts of phosphorus oxychloride are introduced, drop by drop, at 70° C. into a molten mixture of 255 parts of aluminium chloride, 30 parts of sodium chloride, 21 parts of potassium chloride and 9 parts of sodium fluoride. Thereupon a mixture of 15 parts of acenaphthene and 10 parts of cyanoacetic acid is added at 70–80° C. and the whole is stirred for 1 hour at 80° C. The temperature is then raised to 160° C. and maintained for one hour.

After decomposition with ice water, the product is worked up as indicated in Example 1. There is obtained with a good yield the hydrochloride of the same mono-ketimide of the peri-acenaphthene indandione as in Example 1.

(3) Dry hydrogen chloride is introduced into a molten mixture of 127.5 parts of aluminium chloride, 15 parts of sodium chloride 10.5 parts of potassium chloride and 4.5 parts of sodium fluoride and a mixture of 15 parts of acenaphthene and 10 parts of cyano-acetic acid is added at 80° C. The whole is stirred first for 1 hour at 80° C. and then for 5 hours at 160° C. Hydrochloride is introduced in the mixture as long as the reaction lasts. Thereupon the mixture is poured on ice and the product is worked up as in Example 1. The yield of the hydrochloride of the mono-ketimide of the peri-acenaphthene indandione thus obtained is good.

(4) Hydrogen chloride is introduced into a molten mixture as indicated in Example 3 while the whole is first heated for 5 hours to 80° C. and then for a prolonged time to 110° C.–120° C. The yield of the compound thus obtained is the same as that obtained according to Example 3.

(5) 14.2 parts of α-methyl-naphthalene and 10 parts of cyanoacetic acid are introduced at 80° C. into a molten mixture of 255 parts of aluminium chloride, 30 parts of sodium chloride, 21 parts of potassium chloride and 9 parts of sodium fluoride. The whole is stirred at 80° C. for ½ hour and heated subsequently to 160° C.–180° C. for 1 hour.

Thereupon the mass is decomposed with icewater and filtered with suction. The residue is extracted with boiling dilute sulfuric acid; the ketimide hydrochloride of the α-methyl-perinaphthindandione of the following probable formula:

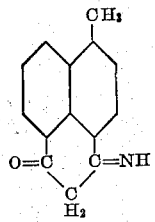

is precipitated from the filtrate by addition of a solution of sodium chloride. The product is a yellow powder, which is soluble in hot water. It dissolves in concentrated sulfuric acid to a yellow solution, having an intense green fluorescence.

The naphthalene-1.4.5-tricarboxylic acid is obtained therefrom by oxidation.

(6) A mixture of 18 parts of anthracene and 10 parts of cyanoacetic acid is introduced at 80° C. into melted aluminium chloride to which the same ingredients have been added as indicated in Example 5. The mixture is heated for 1 hour at 80° C. and subsequently, for 4 hours, at 160° C. After decomposition, the whole is filtered with suction, the residue is extracted with dilute sulphuric acid and the product is then precipitated from the filtrate by addition of a solution of sodium chloride, filtered with suction and dried.

A dark red powder is thus obtained, which dissolves in water to a red solution, and in concentrated sulfuric acid to a bluish-red solution having a yellowish red fluorescence. It probably corresponds with the following formula:

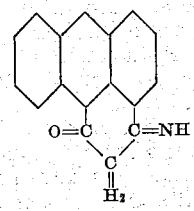

The anthracene-1.9-dicarboxylic acid is obtained therefrom by oxidation.

(7) A mixture of 15 parts of acenaphthene and 10 parts of cyanoacetic acid is introduced at 80° C. into a suspension of 100 parts of aluminium chloride in 200 parts of dry trichlorobenzene. After ½ hour, the temperature is raised to 160° C. and maintained for several hours. The whole is then mixed with water, the trichlorobenzene is expelled by means of steam and the residue is filtered with suction. The product is worked up by extraction with dilute sulfuric acid as described in Example 1. A satisfactory yield is obtained.

(8) Into a melted mixture of 255 parts of aluminium chloride, 80 parts of sodium chloride, 21 parts of potassium chloride and 9 parts of sodium fluoride, there are introduced 30 parts of acenaphthene at a temperature of 80° C. and 26 parts of ethyl ester of cyanoacetic acid are subsequently added drop by drop. The whole is stirred for ¼ hour at 85° C.–90° C. and heated to 160° C. for 1 hour. The product is worked up as described in Example 1 and the hydrochloride of the mono-ketimide of the peri-acenaphthene-indandione is obtained in a satisfactory yield.

(9) 30 parts of acenaphthene and 24 parts of sodium cyanoacetate are introduced at 80° C. into a mixture of aluminium chloride prepared as indicated in Example 8. The whole is heated to 80° C. for ½ hour and then to 160° C. for 1½ hours. After decomposition, the mixture is subsequently worked up as described in Example 1, whereby the hydrochloride of the mono-ketimide of the peri-acenaphthene-indandione is obtained in a satisfactory yield.

(10) 30 parts of acenaphthene, 20 parts of cyanoacetic acid and 150 parts of zinc chloride are thoroughly ground and heated slowly to 160° C., while stirring, whereby a viscous melt is obtained. The above temperature is maintained for 2 hours and the mixture is decomposed with water. The product is worked up as in Example 1 and the hydrochloride of the mono-ketimide is obtained in the form of a yellow crystalline powder.

We claim:

1. The process which comprises causing a compound of the following formula:

CN—CH₂—COOX wherein X stands for hydrogen, and alkali metal or an ethyl group to act first at a temperature of about 70° C. to about 140° C. and then at a temperature of about 150° C. to about 190° C. upon a polynuclear aromatic compound of the acenaphthene, naphthalene and anthracene series containing at least one pair of free peri-positions in the presence of an acid condensing agent.

2. The process which comprises causing a compound of the following formula:

CN—CH₂—COOX wherein X stands for hydrogen, an alkali-metal or an ethyl group to act first at a temperature of about 70° C. to about 140° C. and then at a temperature of about 150° C. to about 190° C. upon a polynuclear aromatic compound of the acenaphthene, naphthalene and anthracene series containing at least one pair of free peri-positions in the presence of an acid condensing agent and an inert diluent.

3. The process which comprises causing a compound of the following formula:

CN—CH₂—COOX wherein X stands for hydrogen, an alkali metal residue or an ethyl group to act first at a temperature of about 70° C. to about 140° C. and then at a temperature of about 150° C. to about 190° C. upon a polynuclear aromatic compound of the group consisting of naphthalene, acenaphthene and anthracene containing at least one pair of free peri-positions in the presence of a metal chloride of acid condensing action.

4. The process which comprises causing a compound of the following formula:

CN—CH₂—COOX wherein X stands for hydrogen, an alkali metal residue or an ethyl group to act first at a temperature of about 70° C. to about 140° C. and then at a temperature of about 150° C. to about 190° C. upon a polynuclear aromatic compound of the group consisting of naphthalene, acenaphthene and anthracene containing at least one pair of free peri-positions in the presence of a metal chloride of acid condensing action and an inert diluent.

5. The process which comprises causing a compound of the following formula:

CN—CH₂—COOX wherein X stands for hydrogen, a sodium metal residue or ethyl, to act first at about 70° C. to about 140° C. and then at about 150° C. to about 190° C. upon a polynuclear aromatic hydrocarbon of the group consisting of naphthalene, acenaphthene and anthracene containing at least one pair of free peri-positions in the presence of a metal chloride of acid condensing action and an inert diluent.

6. The process which comprises causing cyanacetic acid to act first at about 80° C. and then at about 160° C. upon acenaphthene in the presence of aluminium chloride and dry trichlorobenzene.

7. The process which comprises causing cyanacetic acid to act first at about 80° C. and then at about 160° C. to about 180° C. upon alpha-methylnaphthalene in the presence of aluminium chloride mixed with sodium chloride, potassium chloride and sodium fluoride.

8. The process which comprises causing cyanacetic acid to act first at about 80° C. and then at about 160° C. to about 180° C. upon anthracene in the presence of aluminium chloride mixed with sodium chloride, potassium chloride and sodium fluoride.

9. The compound of the following probable formula:

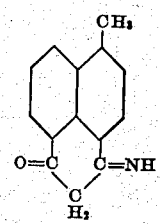

being in the form of its hydrochloride a yellow powder soluble in hot water, which dissolves in concentrated sulfuric acid to a yellow solution of strong green fluorescence and yielding by oxydation the naphthalene 1.4.5-tricarboxylic acid.

10. The compound of the following probable formula:

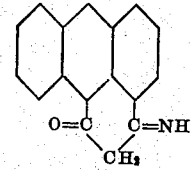

being in the form of its hydrochloride a dark red powder which dissolves in warm water to a red solution and in concentrated sulfuric acid to a bluish-red solution of yellowish-red fluorescence and yielding by oxidation the anthracene-1-9-dicarboxylic acid.

11. The compounds of the general probable formula:

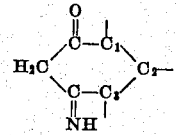

wherein the carbon atoms C₁, C₂ and C₃ are members of an aromatic hydrocarbon radical of the group consisting of naphthalene and anthracene radicals, C₁ and C₃ representing carbon atoms occupying the peri-positions of said hydrocarbon radical.

HEINRICH GREUNE.
GERHARD LANGBEIN.
WILHELM ECKERT.
HEINRICH SIEBER.